(12) United States Patent
Dal Lago et al.

(10) Patent No.: US 11,919,152 B2
(45) Date of Patent: Mar. 5, 2024

(54) VACUUM GRIPPER, FEED UNIT, AND METHOD FOR CONVEYING FLAT COMPONENTS

(71) Applicant: TRUMPF Maschinen Austria GmbH & Co. KG., Pasching (AT)

(72) Inventors: Matteo Dal Lago, Cologna Veneta (IT); Stefano Speziali, Foligno (IT)

(73) Assignee: TRUMPF Maschinen Austria Gmbh & Co. KG., Pasching (AT)

( * ) Notice: Subject to any disclaimer, the term of this patent is extended or adjusted under 35 U.S.C. 154(b) by 493 days.

(21) Appl. No.: 17/274,965

(22) PCT Filed: Sep. 16, 2019

(86) PCT No.: PCT/AT2019/060305
§ 371 (c)(1),
(2) Date: Mar. 10, 2021

(87) PCT Pub. No.: WO2020/056438
PCT Pub. Date: Mar. 26, 2020

(65) Prior Publication Data
US 2022/0032478 A1     Feb. 3, 2022

(30) Foreign Application Priority Data

Sep. 20, 2018   (AT) .............................. A 50803/2018
Oct. 19, 2018   (AT) .............................. A 50908/2018

(51) Int. Cl.
*B25J 15/06*     (2006.01)
*B25J 15/00*     (2006.01)
(Continued)

(52) U.S. Cl.
CPC ....... *B25J 15/0641* (2013.01); *B25J 15/0061* (2013.01); *B25J 15/0683* (2013.01);
(Continued)

(58) Field of Classification Search
CPC .. B25J 19/021; B25J 15/0641; B25J 15/0061; B25J 15/0616; B25J 15/0683;
(Continued)

(56) References Cited

U.S. PATENT DOCUMENTS

| | | |
|---|---|---|
| 5,079,903 A | 1/1992 | Hakansson |
| 5,553,893 A | 9/1996 | Foti |

(Continued)

FOREIGN PATENT DOCUMENTS

| | | |
|---|---|---|
| AU | 2011265490 B2 | 8/2012 |
| CN | 202107270 U | 1/2012 |

(Continued)

OTHER PUBLICATIONS

International Search Report in PCT/AT2019/060305, dated May 19, 2020.

*Primary Examiner* — Thomas M Wittenschlaeger
(74) *Attorney, Agent, or Firm* — Collard & Roe, P.C.

(57) ABSTRACT

The invention relates to an automated vacuum gripper, a feed unit and a method for conveying flat components (3). The vacuum gripper (1) comprises a support part (5), at least one support part element (7), a plurality of first suction elements (4'), which are arranged at the at least one support part element (7) and define a first suction plane; at least one bearing assembly (28) and at least one actuating assembly (29), wherein the at least one support part element (7) is pivotably mounted at the support part (5) by means of the at least one actuating assembly (29) about the at least one bearing assembly (28). The plurality of second elements (4) is arranged at the support part (5) and defines a second suction plane (19). The at least one support part element (7) with its first suction plane defined by the plurality of first suction elements (4') is pivotable from a standby position that is at an angle relative to the second suction plane into (Continued)

a working position that is congruous with the second suction plane, and vice versa.

19 Claims, 9 Drawing Sheets

(51) Int. Cl.
   *B25J 19/02* (2006.01)
   *B65G 47/91* (2006.01)
(52) U.S. Cl.
   CPC .......... *B25J 19/021* (2013.01); *B65G 47/918* (2013.01); *B65G 2201/022* (2013.01)
(58) Field of Classification Search
   CPC ................ B65G 47/918; B65G 47/914; B65G 2201/022; B65G 61/00; B21D 43/18; B21D 5/0281
   See application file for complete search history.

(56) References Cited

U.S. PATENT DOCUMENTS

| | | | |
|---|---|---|---|
| 5,950,485 A | 9/1999 | Sartorio | |
| 6,345,818 B1* | 2/2002 | Stephan | B25J 15/0616 |
| | | | 271/106 |
| 6,886,827 B2 | 5/2005 | Eberle, III | |
| 9,878,364 B2 | 1/2018 | Yoshimoto | |
| 2010/0140969 A1 | 6/2010 | Lin et al. | |
| 2015/0147141 A1 | 5/2015 | Truyens | |
| 2018/0215540 A1 | 8/2018 | Tanaka et al. | |
| 2019/0091754 A1 | 3/2019 | Deiss et al. | |
| 2021/0198053 A1* | 7/2021 | Amadori | B65G 47/908 |

FOREIGN PATENT DOCUMENTS

| | | | | |
|---|---|---|---|---|
| CN | 203975997 U | 12/2014 | | |
| CN | 106395375 A | 2/2017 | | |
| CN | 108147123 A | 6/2018 | | |
| CN | 108328326 A | 7/2018 | | |
| CN | 207596062 U | 7/2018 | | |
| DE | 20 2005 013 790 U1 | 12/2005 | | |
| DE | 10 2006 023 298 B3 | 11/2007 | | |
| DE | 20 2012 009 650 U1 | 11/2012 | | |
| DE | 10 2016 110 542 A1 | 12/2017 | | |
| EP | 0 657 673 B1 | 6/2000 | | |
| EP | 1 215 148 A1 | 6/2002 | | |
| EP | 2 149 521 A1 | 2/2010 | | |
| EP | 2149521 A1 * | 2/2010 | ............ | B65G 59/04 |
| EP | 2 476 637 B1 | 5/2015 | | |
| EP | 1 864 922 B1 | 8/2018 | | |
| JP | S49-47785 B1 | 12/1974 | | |
| JP | H9-504477 A | 5/1997 | | |
| JP | 2013-154968 A | 8/2013 | | |
| JP | 2013-248695 A | 12/2013 | | |
| JP | 2014-184467 A | 10/2014 | | |
| JP | 2018-122945 A | 8/2018 | | |

* cited by examiner

VACUUM GRIPPER, FEED UNIT, AND METHOD FOR CONVEYING FLAT COMPONENTS

CROSS REFERENCE TO RELATED APPLICATIONS

This application is the National Stage of PCT/AT2019/060305 filed on Sep. 16, 2019, which claims priority under 35 U.S.C. § 119 of Austrian Application Nos. A 50803/2018 filed on Sep. 20, 2018 and A 50908/2018 filed on Oct. 19, 2018, the disclosures of which are incorporated by reference. The international application under PCT article 21(2) was not published in English.

BACKGROUND OF THE INVENTION

1. Field of the Invention

The invention relates to a feed unit and a method for conveying flat components, in particular sheet metal parts. In this regard, an automated vacuum gripper is provided, comprising a support part, on which a plurality of second suction elements is arranged, and at least one support part element, on which a plurality of first suction elements is arranged. The at least one support part element is pivotably mounted at the support part by means of at least one bearing assembly.

2. Description of the Related Art

In modern machining centers, workpieces and components are often transported in a fully automated manner. To avoid damage to the component surface or in order to be able to grip a plurality of similar components, the use of vacuum grippers has been widely established. Especially for targeted manipulation of sheet metal parts that are fed into a bending machine, positioned therein and conveyed further by it in the formed state, using vacuum grippers offers significant advantages as opposed to conventional mechanical grippers and the like.

The person skilled in the art knows different approaches for picking up individual components or workpieces up by means of a plurality of suction cups at a joint gripper head of a generic vacuum gripper.

US 2015/0147141 A1, for example, presents a method with a gripper head having a plurality of suction cups, which are associated with a first and a second vacuum circuit and used for gripping workpieces out of a container and conveying them. In this regard, the gripper head in US 2015/0147141 A1 comprises one or multiple rows of suction cups, which are jointly associated with a first shared vacuum circuit, and a second row of suction cups, which are associated with a second vacuum circuit. In this regard, the second vacuum circuit may be controlled specifically in order to effectively create a vacuum only at those suction cups of the second vacuum circuit where it is required. However, such an arrangement does not offer any advantages in the case of larger components, where a plurality of suction cups is simultaneously required for transport. Moreover, only during reception do pressure sensors at each suction cup check whether sufficient negative pressure may be built up, and this check is not possible in the case of wrongly inserted or missing components.

Likewise, the person skilled in the art knows a number of devices for picking up, temporarily fixating and conveying components of different sizes, wherein only those suction cups of a gripper head are active, i.e. impinged with a vacuum, which correspond to the shape of the component. EP 0657673 B1 shall be mentioned as an example here, where a gripper head having a plurality of suction cups is presented, wherein the suction cups are combined into individual groups that may be controlled as required. In this regard, EP 0657673 B1 discloses one group of fixed and two groups of height-adjustable suction cups, wherein the height-adjustable suction cups are active depending on the determined size of a component or may be disabled if required. The fixed and height-adjustable groups are associated with different but shared vacuum circuits with separate lines to a shared pump. By arranging the different suction cups in groups or vacuum circuits, the "shape" of an even component may be imitated as required by controlling the suction cups; however, local failure or a leak at a suction cup may still result in a shift or even loss of the component while it is conveyed.

The increasing machining speeds, which also require increasing conveying and positioning speeds, pose another challenge for safe vacuum grippers. The centrifugal forces on the held components thereby increase as well, which may lead to loss of the component if the contacting of the vacuum gripper is incorrect. In the case of sheet metal parts, which are often sharp-edged, such loss of a component may result in an uncontrolled movement in the machining area. Up to now, safety fences limiting the machining area were used for protecting workers and/or adjacent units. However, safety fences constitute a relatively rigid boundary, and their construction is expensive. Moreover, moving the machining unit to another location in a production hall is very complex as the safety fences have to be disassembled and reassembled, and all safety measures have to be implemented.

Furthermore, vacuum grippers are known which consist of one rigid support part and at least one support part element, wherein a plurality of suction elements is arranged at the at least one support part element. EP 2476637 B1 may be mentioned as an example for this.

Moreover, in the prior art, feed units for flat components can be found, which have a frame-like support structure, on which a conveyor section is arranged. In addition, DE 102016110542 A1 has one or multiple gripping devices.

From EP 2 149 521 A1, a method and a device for lifting a plate-shaped component from a component stack by means of a gripper fastened to a retaining arm and provided with suction cups is known. At least one of the suction cups may be lifted independently of the remaining suction cups by deviating at least one segment of the gripper from the component stack.

CN 106 395 375 A discloses an auxiliary feed device for a machine tool for plate-shaped components. The device comprises an unloading platform, a negative pressure mechanism, a lifting mechanism, a plate transporting mechanism and a plate orientation mechanism.

SUMMARY OF THE INVENTION

It has been the object of the present invention to overcome the disadvantages of the prior art and to provide a device and a method by means of which a component may be easily and securely gripped and conveyed by applying a vacuum, wherein it is also possible to convey components of different dimensions in a process-reliable manner.

This object is achieved by a feed unit and a method according to the invention.

The automated vacuum gripper for components or workpieces, in particular sheet metal parts, comprises on at least one side of a support part of the vacuum gripper a support element, which, with its first suction plane defined by the plurality of first suction elements, can be pivoted about the at least one bearing assembly from a standby position that is at an angle relative to the second suction plane defined by the support part into a working position that is congruous with the second suction plane, and vice versa.

A suction plane is defined by the bottom side or effective plane of the suction elements.

Such a measure may significantly increase versatility of the automated vacuum gripper for different component sizes. The at least one support part element may be arranged laterally at the support part and simply "folded down" if required, i.e. if a larger number of suction elements is required for larger component dimensions. The support part elements may thus have additional suction elements, wherein association and/or controlling of the individual suction elements with a first and/or second vacuum circuit may be made. As a consequence, the suction elements arranged at the support part elements may be divided into separately controllable additional groups to enable easy control. Likewise, the support part elements may be connected to the support part preferably by means of mechanical and/or pneumatic drives, which facilitates automated operation. This enables adjustment which is carried out actively or controlled by a control mechanism from a standby position into a suction position.

In this regard, the standby position is defined by a position which is angled or bent relative to the working position, wherein the angle is greater than 0, in which position the first suction elements of the support part element are not in engagement with a component.

Thus, the vacuum gripper is perfectly suitable for automated use, wherein in the method according to the invention for conveying the components, in particular sheet metal parts or metal plates, at least the following method steps are performed:

providing a feed unit according to at least one aspect of the invention;

shifting the at least one support part element, starting from a first suction plane defined by the plurality of first suction elements, from a standby position that is at an angle relative to the second suction plane into a working position that is congruous with the second suction plane;

picking a component up by means of the vacuum gripper;

moving conveyor elements of the conveyor section from the storage unit of the feed unit;

receiving the component by means of conveyor elements of the conveyor section;

releasing the vacuum gripper from the component;

conveying the component on the conveyor section to a bending unit;

transferring the component to the bending unit.

Since the vacuum gripper may be flexibly adapted to different component sizes, very large sheet metal parts or metal plates may be securely picked up and conveyed with one and the same gripper. As it is possible to simply fold away lateral parts of the vacuum gripper that are not being used and thus save space, it is also possible with the vacuum gripper to handle components in narrow spaces or selectively lift up components from component stacks positioned close to one another. In this regard, the components in each component stack of the component stack arrangement may have different sizes, wherein the vacuum gripper may be relatively simply adapted to the respective component sizes.

It may further be appropriate if the first suction elements of the support part element have the same dimensions relative to one another with regard to height and/or diameter. This way, it can be ensured that evenly distributed suction force is applied to the entire surface on which the suction elements of the support part element are engaged.

It is also conceivable that on the individual different support part elements associated with a support part, suction elements of different dimensions with regard to height and/or diameter are arranged. If a heavy component is to be picked up, a support part element with larger suction element dimensions may be involved, in particular folded into a working position, to securely hold the component or pick it up with increased suction force.

By providing suction elements of different heights—in relation to their suction direction—, it is possible to pick up components of non-planar geometries with the vacuum gripper.

It may further be provided that the second suction elements of the support part have different dimensions relative to one another with regard to height and/or diameter. With this structure, it can in turn be ensured that a component to be picked up is securely held in its center by suction elements of larger dimensions, with which a higher suction force may be applied. Another advantage here is that applying a higher suction force in the area of the component center relative to the component longitudinal axis may prevent sideward tilting of the component while it is lifted up.

In addition, it may be provided that the first suction elements are connected to a first vacuum circuit and that the second suction elements are connected to a second vacuum circuit. Advantageously, by providing separate circuits, redundancy may be created, so that in the event of failure of a vacuum circuit, the suction elements associated with the other vacuum circuit may still hold the component. Also, with this structure with two different vacuum circuits, a higher vacuum may be applied in one vacuum circuit to a partial area of the component; this way, even heavier components may be securely held.

An embodiment is also advantageous according to which it may be provided that the actuating assembly comprises a mechanical and/or pneumatic actuator, which facilitates automated operation. One or multiple support part elements may thus be brought into a working position easily and quickly, depending on the size of the component to be picked up or the available space.

According to a further development, it is possible that the support part element in turn comprises multiple individual support part elements, which are hingedly connected to each other. This way, on the one hand, flexible adaptability to different component sizes may be increased, and, on the other hand, components of different, non-planar geometries may be conveyed with the vacuum suction device.

The hingedly connected individual support part elements may in turn be provided with mechanical and/or pneumatic drives.

It may further be appropriate if on opposite sides of the support part, one support part element is respectively provided. Said support part elements may be either individually or jointly folded into a working position to enable secure engagement over the entire component width.

Moreover, the vacuum gripper is associated with a feed unit according to the invention, in particular for flat components, such as sheet metal parts or metal plates, of a bending machine of a bending unit, which feed unit comprises the following structural features:

a frame-like support structure;
a vacuum gripper for flat components, comprising a support part, at least one support part element, a plurality of first suction elements, which plurality of first suction elements are arranged at the at least one support part element and define a first suction plane,
a portal-like guiding structure for the vacuum gripper, which guiding structure is associated with the frame-like support structure;
a conveyor section running in the lateral parts of the frame-like support structure;
wherein the vacuum gripper additionally comprises at least one bearing assembly and at least one actuating assembly, wherein the at least one support part element is pivotably mounted at the support part by means of the at least one actuating assembly about the at least one bearing assembly, and
wherein the vacuum gripper with a plurality of second suction elements is arranged at the support part, wherein the plurality of second suction elements define a second suction plane, and wherein the at least one support part element with its first suction plane defined by the plurality of first suction elements can be pivoted about the at least one bearing assembly from a standby position that is at an angle relative to the second suction plane into a working position that is congruous with the second suction plane, and vice versa; and
wherein the conveyor elements forming the conveyor section are retractable and extendable relative to a storage unit of the feed unit.

Advantageously, with the aforementioned structure, a component picked up with the vacuum gripper may be placed on the conveyor section and conveyed further to the bending unit. In this process, by providing an additional stop element at the conveyor section, an orientation of the component may be achieved which is desired for the bending operation.

Due to the aforementioned structure, according to which the conveyor elements forming the conveyor section are retractable and extendable relative to a storage unit, the pick-up location for the components may be arranged underneath the conveyor section. In this regard, the components may be stored on pallets as component stacks, wherein it may also be provided here that components of different sizes lie on the pallets. Depending on the component size required for further processing, by means of the component gripper, a component may be picked up from a stack on which components of the desired size are stored.

In this regard, individual conveyor elements or the conveyor elements of the entire conveyor section may be retracted and extended into the storage unit.

With the structure of the conveyor section according to the invention and by storing component stacks under the conveyor section, the conveyor section may also be employed in narrow spaces as the space under the conveyor section, which is typically not used, may be used as well.

It may further be provided that the portal-like guiding structure for a vacuum gripper has a support arm, which is movable, preferably multiaxially, and at which the vacuum gripper is arranged. The movable support arm enables moving the vacuum gripper to different component stacks and directly picking up the components of a particular component stack up directly from the storage location under the conveyor section.

According to a special embodiment, it is possible that the vacuum gripper is hingedly mounted at the support arm about a horizontal hinge axis. When a component is picked up, the vacuum gripper, together with the component thereon, may be brought into an angled position by gravity or the center of gravity. Advantageously, the vacuum gripper only engages with the component in a partial area, wherein the component, during lifting above the hingedly mounted vacuum gripper, is brought into an angled position, in which individual conveyor elements of the conveyor section may move under the component and receive it in a load-absorbing manner.

The individual conveyor elements may be individual lamellas, which may be rigid or flexible. In this regard, the lamellas may also be equipped with brushes, for example to prevent shifting of components during conveying.

According to an advantageous further development, it may be provided that on the side or front face of the support part and/or support part element opposite of the second and/or first suction elements, a means for measuring the thickness of a flat component is provided. By measuring the thickness of a component while it is picked up, it may be checked whether a component having the thickness required for further processing on a machine tool has been picked up. It may further be checked by means of the aforementioned thickness measurement means whether multiple components that adhere to each other have erroneously been lifted up. Due to the process, grease may occur between individual sheet metal plates, which may cause the sheet metal plates to adhere to each other. The device according to the invention is thus perfectly suitable for process-reliable separation of components from a component stack.

In this regard, the thickness measurement means may be formed by electromechanical, inductive, capacitive and/or optical sensors.

In particular, it may be advantageous if on the side of the support part and/or support part element opposite of the second and/or first suction elements, a pressing means for a flat component is provided. This way, safety during conveying or lifting of a component may be additionally increased by applying retention force to the component by means of the pressing means in addition to the suction elements. In this process, only low pressing force may be applied, for example by merely applying the pressing means, for example to prevent sideward tilting or to ensure that one or multiple suction elements opposite of the pressing means completely engage with the component.

It may further be provided that on the side of the support part and/or support part element opposite of the second and/or first suction elements, a combined pressing and thickness measurement means for a flat component is provided. This way, the thickness of the component may be measured during pressing on a component.

Moreover, it may be provided that the thickness measurement means comprises a bent measuring finger provided for being applied to a flat component to be measured. Said measuring finger may be pivotably or hingedly arranged on one side of the vacuum gripper and, if required, folded down and brought into engagement with the component. The component thickness may be measured by means of the bent measuring finger based on the ratio between the angular position of the measuring finger and the component thickness. Depending on the position of the measuring finger, the thickness of the component may thus be derived.

An embodiment is also advantageous according to which it may be provided that the pressing means is configured for controlled activation and deactivation of a pressing force towards the measuring finger and for increasing and reducing a retention force of the vacuum gripper towards a flat component. By means of the measuring finger, a controlled pressing force may thus, if desired, be applied to the component to increase process reliability during the lifting operation.

According to a further development, it is possible that the conveyor elements of the conveyor section are adapted for moving under a flat component from a position at least partially or one-sidedly lifted by means of the vacuum gripper and receive it in a load-absorbing manner. In this process, the vacuum gripper, which is hingedly mounted at the support arm about a horizontal hinge axis, may, when picking up a component, be brought into an angled position together with the component thereon. In the structure according to the invention, it is therefore not necessary to bring a vacuum gripper into engagement over the entire surface of the component to be handled. In an at least partially or one-sidedly lifted position of the component, the latter may already be transferred to the conveyor section by being received in a load-absorbing manner by individual conveyor elements.

In addition, if the vacuum gripper only partially engages with regard to the entire component surface, a lower retention force is required than if the vacuum gripper engages over the entire component surface.

Moreover, by shifting a component into an angled position relative to the conveyor section, process-reliable and gentle transfer to a conveyor section may be ensured by avoiding wedging or bracing of the component caused by deflection of the component during transfer.

The feed unit according to the invention is thus particularly suitable for automated use, wherein in the method according to the invention for conveying components, in particular sheet metal parts, at least the following method steps are performed:

providing a feed unit according to at least one aspect of the invention;
shifting the at least one support part element, starting from a first suction plane defined by the plurality of first suction elements, from a standby position that is at an angle relative to the second suction plane into a working position that is congruous with the second suction plane;
picking a component up by means of the vacuum gripper;
moving conveyor elements of the conveyor section from the storage unit of the feed unit;
receiving the component by means of conveyor elements of the conveyor section;
releasing the vacuum gripper from the component;
conveying the component on the conveyor section to a bending unit;
transferring the component to the bending unit.

This way, it may be ensured that the components are securely and quickly conveyed to a bending unit, wherein components are advantageously transferred to the bending unit in the correct orientation required for further processing. If, after a component has been picked up from a stack, it is desired to shift the component into an alternating spatial position, the following steps may be provided:

rotating the component about a horizontal plane defined by the component, wherein said rotation is carried out by means of the support arm at which the vacuum gripper is hingedly mounted;
orienting the component located on the conveyor section by moving a stop element, which may be located on one side of the support structure, in the direction of the machine x-axis.

Furthermore, it may be provided that after the component has been picked up from a component stack, the component thickness is measured to ensure that, on the one hand, a component having a thickness desired for further processing has been picked up, and that, on the other hand, only one single component has been received.

It may further be provided that after the component has been picked up from a component stack, a pressing means engages with the bottom side of the component, by means of which pressing means a component may be additionally secured during conveying.

According to a special embodiment, it is possible that the conveyor elements of the conveyor section move under a flat component from an at least partially or one-sidedly lifted position shifted by means of the vacuum gripper and receive it in a load-absorbing manner. In this regard, it is particularly advantageous that the component to be received is mainly deflected along a component longitudinal axis and that the component, due to the conveyor elements being successively moved under it, is brought into an even, planar position, which enables further conveying along the conveyor section.

With this method step, wedging or bracing of the component while it is laid down caused by undesired deflection of the component while it is transferred from a vacuum gripper to a conveyor section is prevented. It may thus be ensured that the component is transferred in a gentle and process-reliable manner and consequently quickly and securely conveyed further.

In this regard, it is not necessary in the method according to the invention that the component is completely lifted from the component stack. This is in turn facilitated by the fact that the vacuum gripper may be hingedly mounted at the support arm about a horizontal hinge axis in order to shift a component into a tilted position either actively or by gravity or the center of gravity. It may thus be sufficient to lift a partial area of the component above the horizontal plane defined by the conveyor section, wherein the component may remain supported on the component stack with another partial area. The conveyor elements may then successively move under the component and completely receive it while the vacuum gripper initially remains in the described position and may subsequently be lowered to the conveyor plane of the conveyor section if necessary.

It is further advantageous in this regard that deflection along the component width may be mostly reduced or completely avoided due to the adjustable vacuum gripper, which may additionally facilitate process-reliable and gentle moving of the conveyor elements under the component.

BRIEF DESCRIPTION OF THE DRAWINGS

For better understanding of the invention, the latter is explained in detail with reference to the following figures.

The following is shown in highly simplified, schematic representation.

DETAILED DESCRIPTION OF THE PREFERRED EMBODIMENTS

First of all, it should be noted that in the embodiments described in different ways, identical parts are given identical reference numbers or identical component names, and the disclosures contained in the entire description may be correspondingly applied to identical parts with identical reference numbers or identical component names. Moreover, the position indications used in the description, such as at the top, at the bottom, lateral, etc. directly refer to the figure shown and described, and, if a position changes, said position indications are to be correspondingly applied to the new position.

Figure 1:
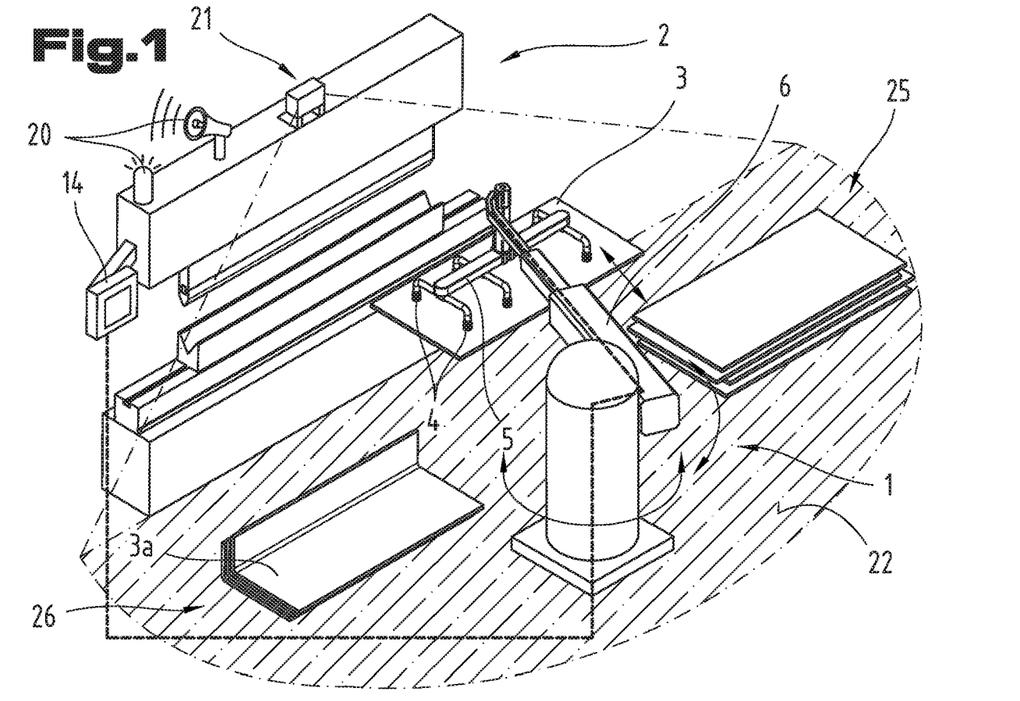
FIG. 1 a schematic representation of a possible arrangement of a machining center.

In FIG. 1, a schematic representation of a possible machining center can be seen, wherein an automated vacuum gripper 1 can be seen apart from a machine tool 2. The vacuum gripper 1 serves for quickly and securely conveying components 3 from a pick-up location 25 to a machine tool 2 and/or a deposition location 26 for processed components 3a.

Figure 2:
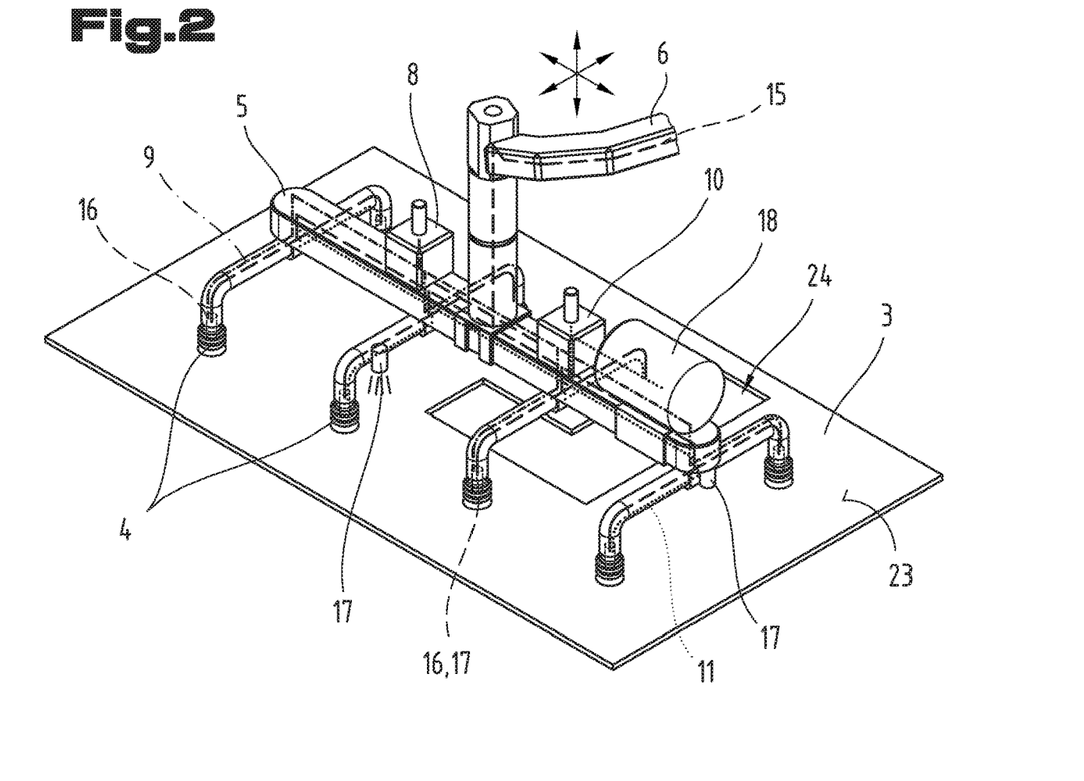
FIG. 2 a schematic representation of a possible embodiment of a vacuum gripper.
Figure 4:
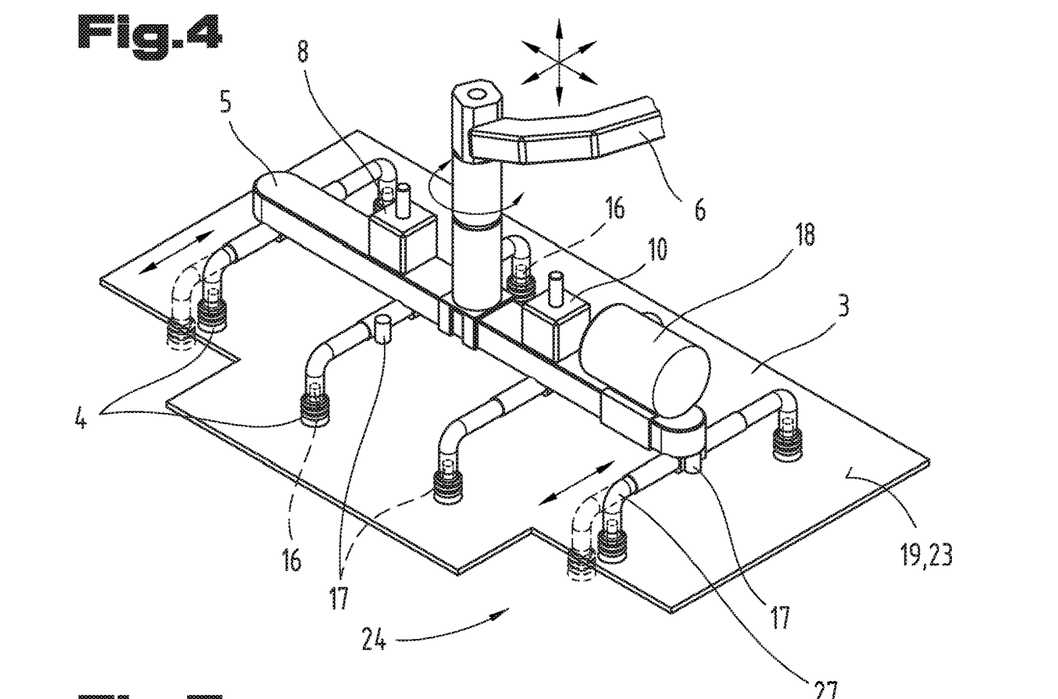
FIG. 4 a possible embodiment of a vacuum gripper with a support part with adjustable suction elements.
Figure 5:
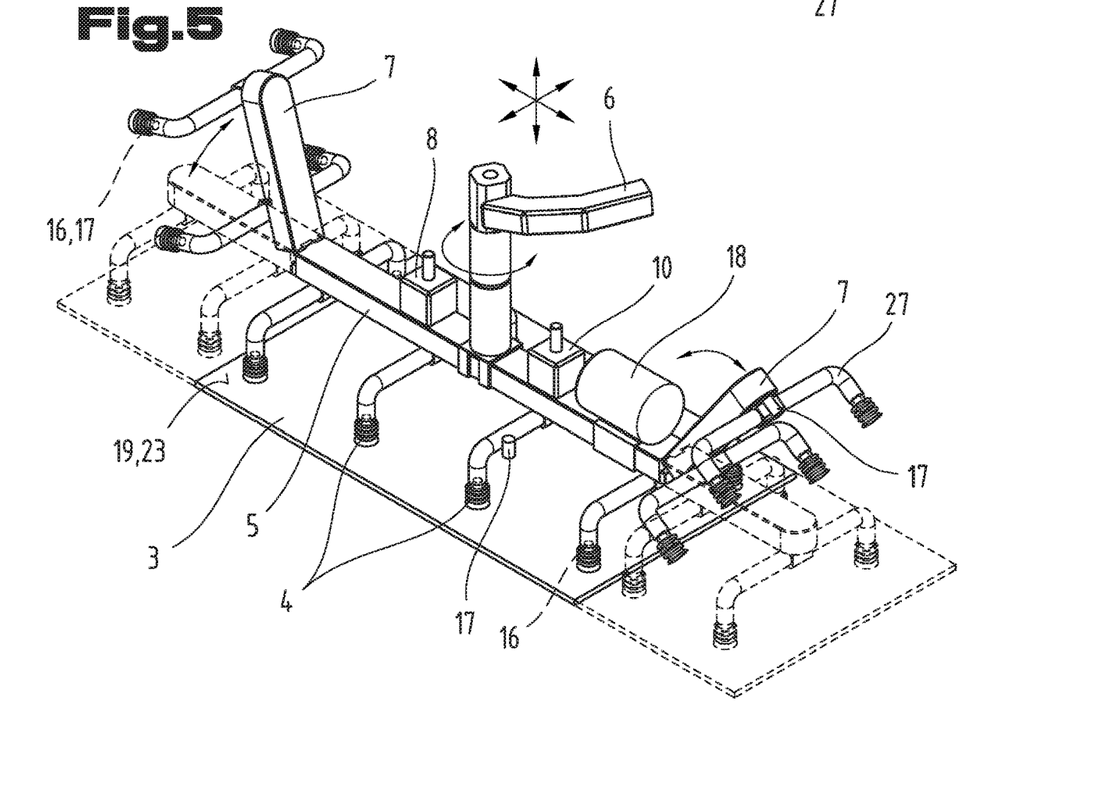
FIG. 5 a possible embodiment of a vacuum gripper with a support part and support part elements.

As can be seen from FIG. 1, in particular in combination with FIG. 2 and FIG. 4 and FIG. 5, the vacuum gripper 1 may be configured as a multiaxially movable manipulator or robot. On the movable support arm 6, a movable support part 5 is arranged, which has a plurality of suction elements 4 for contacting the component 3. For the sake of simplicity, the machining area 22 and the area of movement of the vacuum gripper are illustrated jointly by means of a hatched area, although this are should be understood as a three-dimensional space. This machining area 22 may thus be preferably three-dimensionally monitored by an environment monitoring means 21, wherein said environment monitoring means 21 is preferably arranged at an elevated location, for example on the machine tool 2. Alternatively, however, such an environment monitoring means 21 may also be arranged on a hall ceiling or at the vacuum gripper 1 itself. Light barriers or light fences, which are known to the person skilled in the art and not shown in FIG. 1, may be used as environment monitoring means 21 independently or in combination with the three-dimensional environment monitoring means 21 described above. The machining area 22 may also be additionally divided into a warning area and a further inward security area.

In FIG. 1, the exemplary arrangement of a system controller 14 in the form of a display at the machine tool 2 can be seen. The connection to the vacuum gripper and any further components or elements of the machining center may be wired or wireless, for example via WiFi or Bluetooth, and is schematically indicated with a dashed line.

Furthermore, a schematic arrangement of elements of an optical and/or acoustic warning device 20 at the machine tool 2 can be seen in FIG. 1. Additional or alternative arrangements, for example at the vacuum gripper 1 and particularly in the form of optical warning devices 20 at the support part are not shown but easily comprehensible for the person skilled in the art.

In FIG. 2, a schematic representation of a possible embodiment of a support part 5 with a plurality of suction elements 4 arranged thereat is shown. As explained above, the support part 5 is movably attached to the support arm 6, which is movable as well, and a compressed air supply 15 is schematically indicated. As schematically shown with the dashed line, the compressed air supply 15 may be configured for supplying the first 8 and the second vacuum generators 10. The required lines are not shown. The dashed lines also show the possibility to connect the compressed air supply 15 to individual ones or all of the suction elements 4, for example to specifically interrupt a controlled, compressed-air supported interruption of the vacuum at the suction elements 4, or even to enable blowing off of the held component 3.

From FIG. 2, a possible advantageous arrangement of the two vacuum generators 8, 10 at the support part 5 can be seen. With the second vacuum generator 10, a vacuum tank 18 is connected for ensuring a vacuum redundantly and quickly when required. The formation of a first and a second vacuum circuit 9, 11 is only schematically indicated with dotted or dotted and dashed lines, wherein the second vacuum circuit 11 (dotted and dashed lines) must be connected to the vacuum tank 18.

The component 3, which is shown by way of example in FIG. 2 as a pre-bent sheet metal part with cutouts 24, is held by the suction elements 4, which are associated with a first group 12 of suction elements 4. The selected embodiment is intended to shown that it is possible to bring a second group 13 of suction elements 4 into contact with the component 3 as well, although no vacuum is applied to said suction elements 4 during normal operation.

In addition, the position of two second sensor devices 17 at the support part 5 can be seen from FIG. 2. This exemplary arrangement shows that the second sensor devices 17 configured as optical sensors may relatively easily detect a possible relative movement of the component 3 relative to the sensor devices 17 and thus also relative to the support part 5. A plurality of first sensor devices 16 are also shown by way of example as dashed elements, which may be arranged in the form of pressure sensors or pressure measurement cells preferably in the line network or directly at the suction elements 4 of the first and/or the second vacuum circuit 9, 11. Monitoring by the first and second sensor devices 16, 17 is carried out continuously, starting when the component 3 is picked up until it is deposited within the machine tool 2 or at the deposition location 26.

In the event of an interruption or even already in the event of a settable vacuum loss of the first vacuum circuit 9, the system controller 14 may give an alarm, which at least causes a switching element, which is not shown, to activate the second vacuum circuit 11. The alarm may also be given additionally or independently when a relative movement of the component 3 is detected by the at least one second sensor device 17.

It can particularly clearly be seen from FIG. 2 that due to the short line paths, the spatial proximity of the vacuum tank 18 facilitates applying a vacuum to the second vacuum circuit 11 when required. Likewise, it can be seen from FIG. 2, in particular in combination with FIG. 1, that when an alarm is given, the component 3 may be slowed down in its movement by the support part 5 or the support arm 6 and/or lowered in the vertical direction so as to avoid damage to operators and/or systems if the component is lost.

Figure 3A:
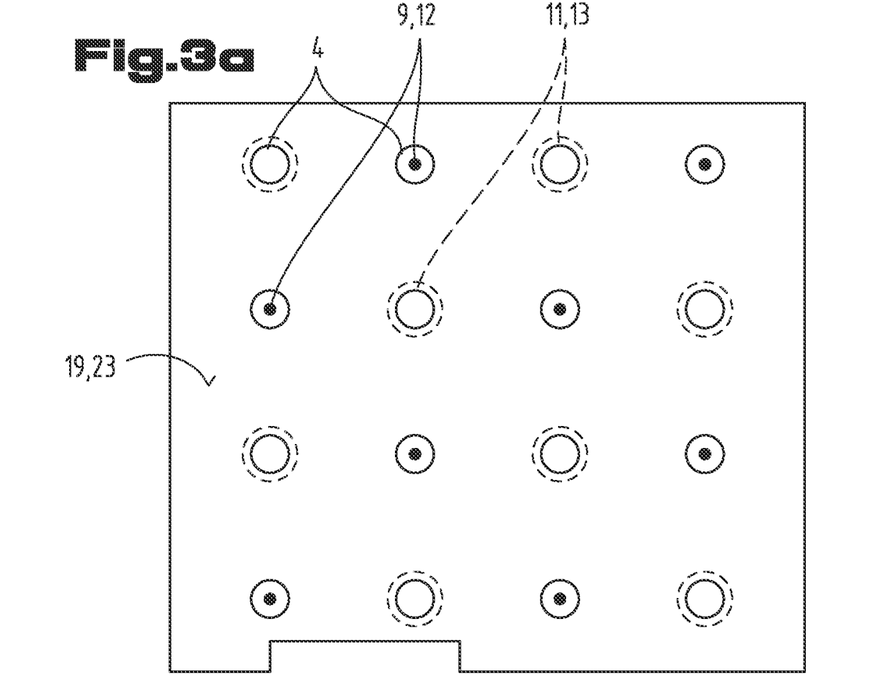
FIG. 3 a schematic representation of the interconnection/functioning principle of the first and second vacuum circuits, which are associated with different suction elements (a) or identical suction elements (b)
Figure 3B:
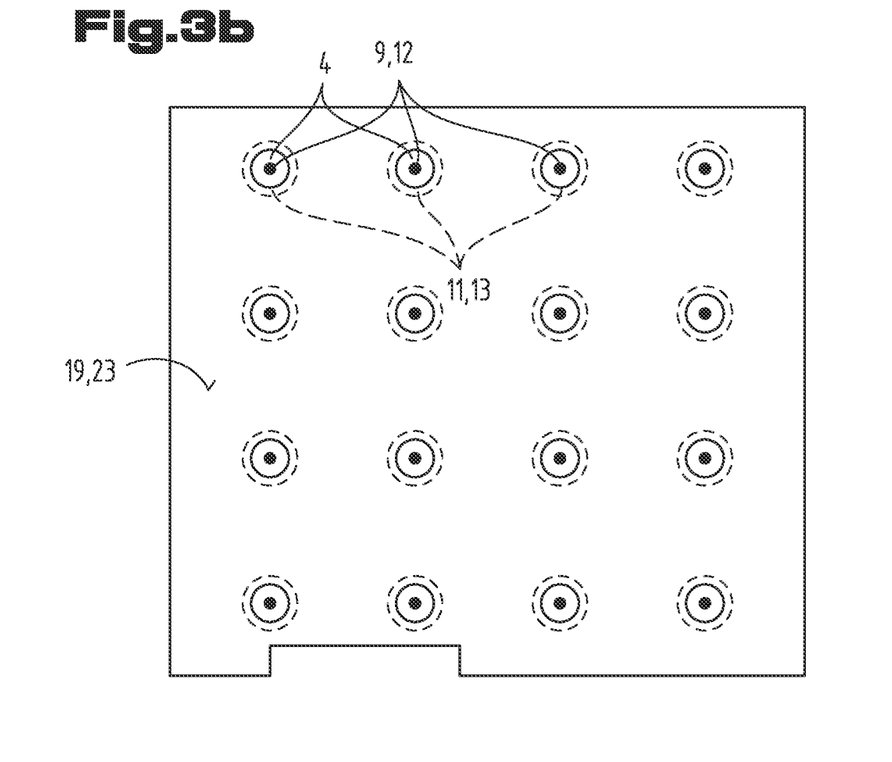

FIG. 3 serves for illustrating the interconnection principle of the redundant embodiment of the second vacuum circuit 11. In FIG. 3a and FIG. 3b, possible connection patterns of a plurality of suction elements 4 arranged in an array-like manner in a first and a second vacuum circuit 9, 11 are shown by way of example. The suction elements 4 associated with the first vacuum circuit 9 or the first group 12 of suction elements 4 are marked with a dot within the suction element 4. The suction elements 4 associated with the second group 13 and/or the second vacuum circuit 11 are marked with a second dashed ring around the respective suction element 4. The suction elements 4 are merely schematically indicated in plan view without a support part 5 or vacuum generators 8, 10, wherein in the image plane, a component 3 can be seen, the surface 23 of which serves as an ideal flat surface as suction plane 19 for the suction elements 4.

In this regard, in FIG. 3a, the possibility is shown to join a first group 12 of suction elements 4 into a first vacuum circuit 9. The shown arrangement where every other suction element 4 is associated with the first vacuum circuit 9 is only one of many possible arrangements. The first group 12 of suction elements 4 primarily serves for receiving and conveying a component 3, while it can be seen from the plan view that the second group 13 of suction elements 4 is in contact with the component 3 at the suction plane 19 but not active during normal operation. As described above, in the event of an alarm, the second vacuum circuit 11 is activated, and the component 3 may be held at least for a short period of time. The lines or the line network required for separate supply of the first and second vacuum circuits 9, 11 in FIG. 3a are not shown.

In FIG. 3, a possible alternative arrangement or interconnection by means of a line network that may be jointly used for the first and second vacuum circuits 9, 11 is indicated. Thus, the first group 12 of suction elements 4 may be simultaneously associated with the first and second vacuum circuits 9, 11, wherein during normal operation, only the first vacuum circuit 9, i.e. the vacuum supply by means of the first vacuum generator 8, is active. In the event of an emergency or an alarm, the line network of the first vacuum circuit 9 may be used by adding or switching to the second vacuum circuit 11, wherein the vacuum at the suction elements 4 may be maintained at least for a short period of time by means of the vacuum tank 18.

A possible embodiment of a vacuum gripper 1 with a support part 5 having adjustable suction elements 4 is outlined in FIG. 4 by way of example. There, a plurality of suction elements 4 can be seen, which are adjustable at least in a direction of the suction plane 19, i.e. substantially parallel to a component surface 23 to be contacted. Dashed lines indicate positions in which the suction elements 4 would grip a cutout 24 or opening of the component 3; therefore, in the selected illustration, the suction elements 4 have been adjusted such that all suction elements 4 are in contact with the component 3. The suction elements 4 may either be separately adjustable or by means of adjustable holding elements 27, as shown in the exemplary illustration. The suction elements 4 and/or holding elements 27 may be adjusted by means of electric and/or pneumatic drives, which are not shown in detail, and controlled by the system controller 14.

It is also possible that the suction elements 4 are height-adjustably and/or pivotably attached relative to the support part 5 and/or a holding element 27. Such an embodiment is not shown here as for the person skilled in the art, the teaching should be sufficient that unevenness and/or distortion of the component may be compensated this way.

In addition, or as an independent embodiment, it may be advantageous if the support part 5 of the vacuum gripper 1 has one or multiple support part elements 7, which are pivotably or rotatably attached to the support part 5. Such a possible embodiment is shown in FIG. 5 by way of example, where two support part elements 7 are pivoted upward in the vertical direction. The support part elements 7 may be moved by means of their own electric and/or pneumatic drives. Through an information stored in the system controller 14 on the dimensions and/or the geometry of the components 3 to be conveyed, the support part elements 7 may be used for increasing or reducing the available suction plane 19 if required. The support part elements 7 may also have adjustable holding elements 27 and/or adjustable suction elements 4. The suction elements 4 may be controlled or associated with a first and/or second vacuum circuit 9, 11 by analogy with the aforementioned examples. As can be seen from FIG. 5, this measure may be used for adapting the available number of suction elements 4 or the space required by the support part 5 in an easy and automated manner.

The vacuum grippers 1 shown in FIGS. 1 and 2 and in FIGS. 4 and 5 may have one or multiple second sensor devices 17, which are not shown in detail and configured as optical sensors. The person skilled in the art may easily imagine that such sensors and in particular their light sources may also be arranged within a suction element 4, as indicated by FIGS. 2, 4 and 5. The first and second sensor devices 16, 17 are not shown separately in detail in these embodiments as it is on the person skilled in the art to choose suitable positions and/or sensors according to the above information and arrange them as required.

Figure 6:
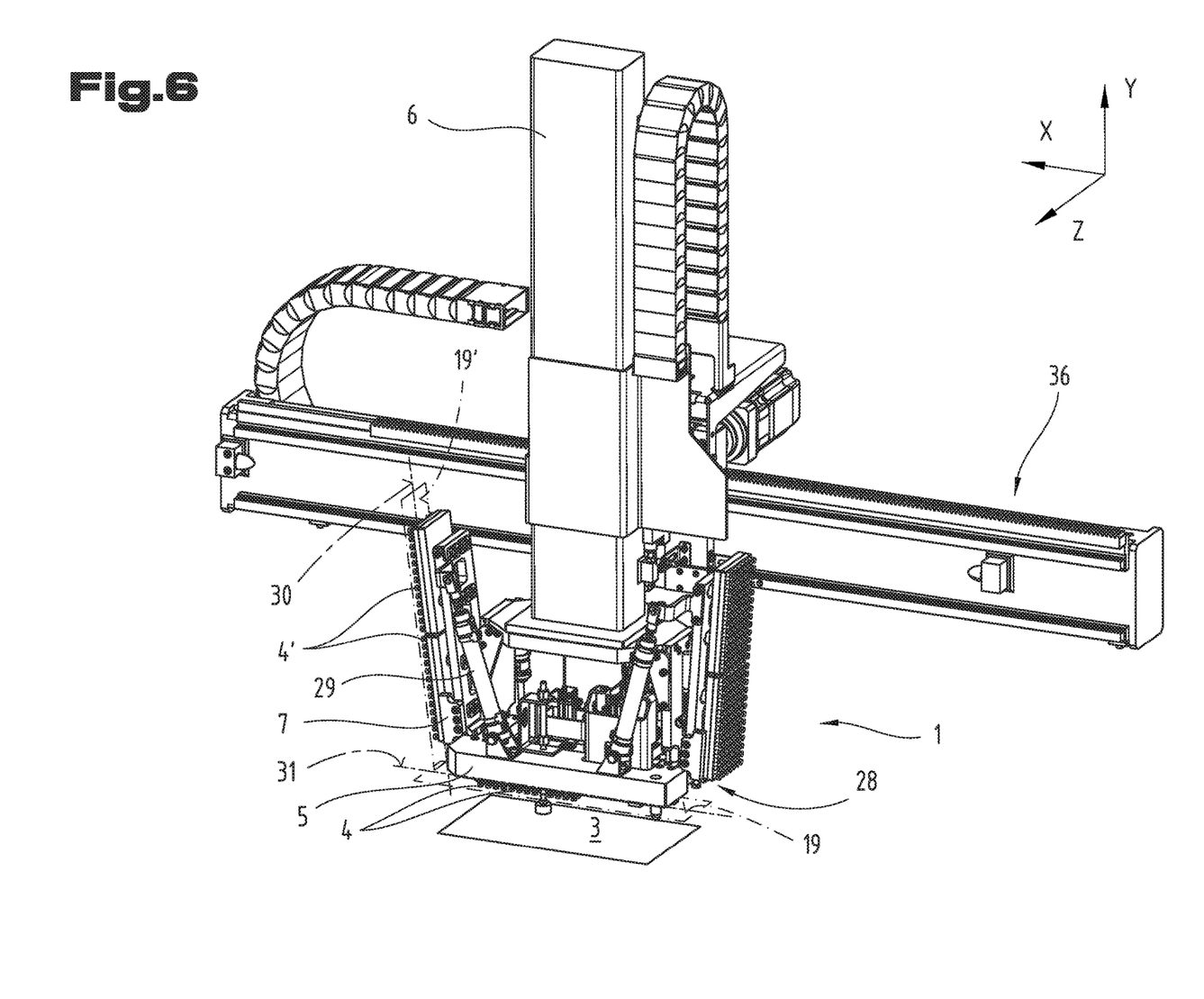
FIG. 6 a possible embodiment of a vacuum gripper with a support part and support part elements in a standby position.

FIG. 6 shows a vacuum gripper 1 for flat components 3 in a standby position 30. The bottom side of a plurality of first suction elements 4', which are affixed to a support part element 7, in this regard forms a first suction plane 19', which is in an angular position relative to the second suction plane 19. The second suction plane 19 is defined by the bottom side of the second suction elements 4 located at a support part 5.

It can be seen from FIG. 6 that a particularly space-saving arrangement in a standby position 30 is achieved if the support part elements 7 are at a 90° position relative to the support part 5. In this regard, the support part elements 7 arranged in a wing-like manner are folded out or in about a bearing assembly 28 by means of electric and/or pneumatic drives. The actuating assembly 29 shown by way of example in FIG. 6 is constituted by actuating cylinders, by means of which the movement about the bearing assembly 28 is realized.

In this regard, the vacuum gripper 1 is associated via a support arm 6 with a portal-like guiding structure 36, along which the vacuum gripper 1 is movable in the x-direction of the feed unit in a controlled manner.

Figure 7:
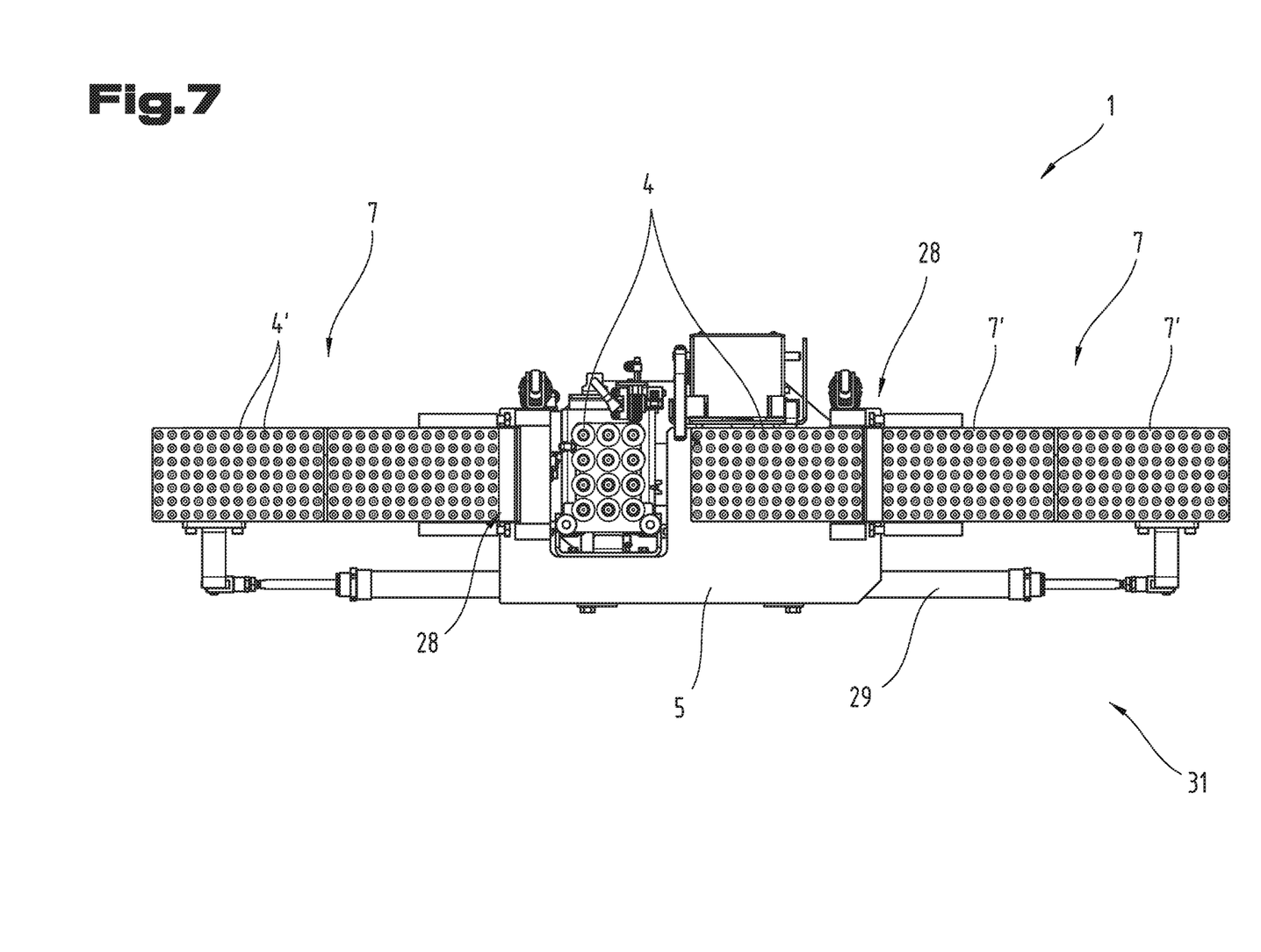
FIG. 7 a possible embodiment of a vacuum gripper with a support part and support part elements and suction elements of different dimensions, where the support part elements are in the working position.

FIG. 7 shows a detailed view of the bottom side of the vacuum gripper 1 in a working position 31. In this regard, the support part elements 7 arranged at the support part 5 on two opposite sides have been brought into the aforementioned working position 31 via the bearing assembly 28. In this position, it is possible to grip components 3 of a larger width than the support part 5 over the entire component width. In this regard, the exemplary actuating assembly 29 for folding the support part elements 7 out or in is formed by extended working cylinders.

To further increase flexibility of the vacuum gripper 1 with respect to the component width to be handled, in an advantageous embodiment, the support part elements 7 may comprise multiple individual support part elements 7', which are schematically indicated in FIG. 7. In this regard, the individual support part elements 7' are advantageously again adjusted with their own electric and/or pneumatic drives, wherein a pivoting motion about a bearing assembly between the individual support part elements 7', which is not shown in detail, is performed.

FIG. 7 also shows that the first and/or second suction elements 4, 4' may have different dimensions with respect to the suction element diameter. In the embodiment shown, the second suction elements 4 at the support part 5 have different diameters, for example to be able to securely handle heavy components as well.

By contrast to the variant shown in FIG. 7, the suction elements 4' at the support part elements 7 may have a dimension alternating from the suction elements 4 arranged at the support part 5, wherein the suction elements 4 at the support part 5 have the same diameter.

Apart from the diameter, the suction elements 4, 4' may also have different heights with respect to their suction or operating direction. However, this is not shown in detail in the figures.

Figure 8:
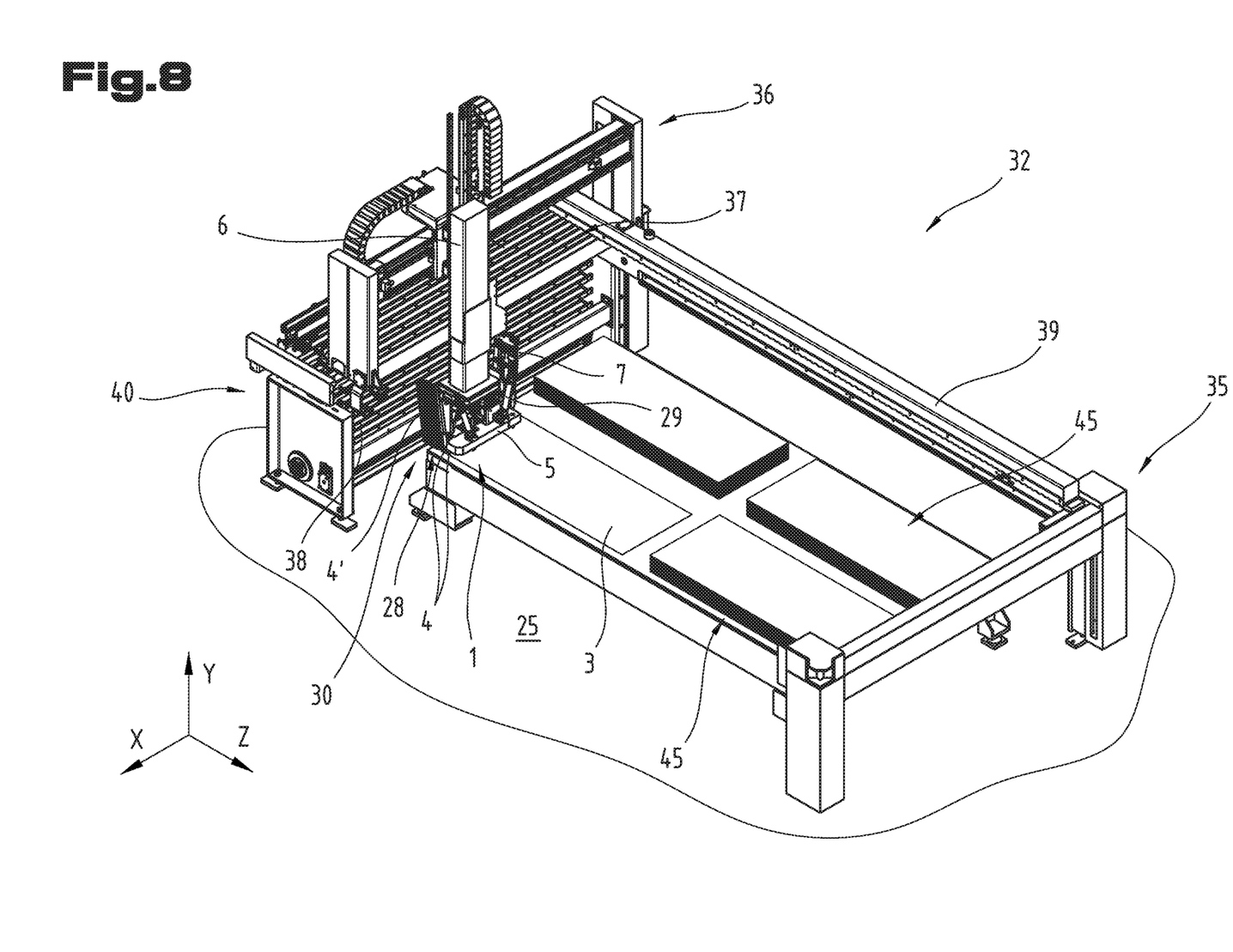
FIG. 8 a schematic representation of a feed unit.

FIG. 8 shows a feed unit 32 to a bending unit 33, on which the vacuum gripper 1 according to the invention is arranged. Via a support arm 6, the vacuum gripper is arranged at a portal-like guiding structure 36, which is supported on a support structure 35.

The lateral parts 39 of the support structure 35 are adapted for guiding conveyor elements 38 of a conveyor section 37. Individual ones or all of the conveyor elements 38 may be moved into a storage unit 40 in order to clear a pick-up location 25 underneath the conveyor section 37.

As soon as all or individual ones of the conveyor elements 38 have moved into the storage unit 40, a vacuum gripper 1 may receive components 3 that lie on component stacks 45. In this regard, the component stacks 45 are stored at a pick-up location 25, which is underneath the support structure 35, in which the conveyor section 37 is guided in the lateral parts 39.

Figure 9:
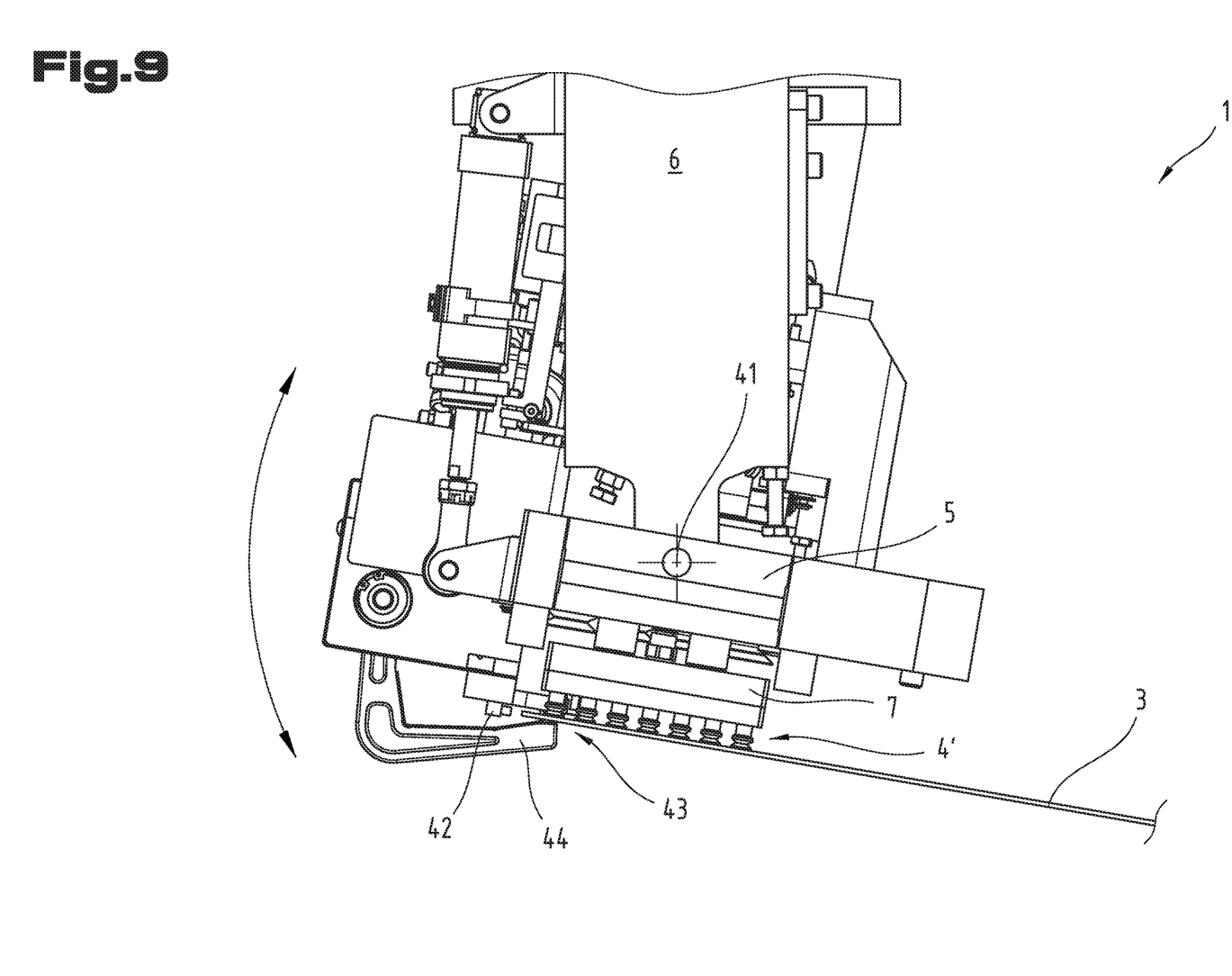
FIG. 9 a possible embodiment of a vacuum gripper with hinged mounting at a support arm and a pressing/sensor means for thickness measurement.

As can be seen from FIG. 9, in a preferred embodiment, the vacuum gripper 1 is mounted at the support arm 6, which is preferably multiaxially movable, about a horizontal hinge axis 41.

As can be seen from FIGS. 6 to 9 in combination, a component 3 is picked up by the vacuum gripper 1 and subsequently transferred to a conveyor section 37 preferably as follows:

clearing a pick-up location 25 for component stacks 45 underneath a conveyor section 37 by moving all or individual ones of the conveyor elements 38 of the conveyor section 37 into the storage unit 40, which is arranged at a front face of a support structure 35;

moving the vacuum gripper 1 to a selected component stack 45 by means of the portal-like guiding structure 36, which component stack 45 comprises components 3 of dimensions required for further processing;

adjusting the vacuum gripper 1 into the working width required for gripping the components 3 and into a working position 31 by pivoting support part elements 7 about a bearing assembly 28 by means of an actuating assembly 29, wherein the vacuum gripper 1 only engages partially, preferably in a front area relative to the component longitudinal axis;

applying a vacuum to the suction elements (4, 4') for picking up the component 3, and one-sidedly or tiltedly lifting the component 3 by moving the vacuum gripper 1 in the y-direction of the feed unit 32, wherein the vacuum gripper 1 is pivoted about the hinge axis 41 at the support arm 6;

successively moving the conveyor elements 38 of the conveyor section 37 under the component 3, which is in an angled position above the support structure 35, by extending the conveyor elements 38 from the storage unit 40;

cutting off the vacuum at the vacuum gripper 1 when the conveyor elements 38 of the conveyor section 37 have completely moved under the component 3, and transferring the component 3 to the conveyor section 37 for further conveying of the component 3.

The information which component dimensions are required for processing on a bending machine 34 and moving and adjusting a vacuum gripper 1 based thereon are performed by an electronic control, which is not described in detail.

It is also possible to provide, laterally at the support structure 35, a stop element, which is not shown in detail, by means of which a component 3 that has been transferred to the conveyor section 37 may be aligned or oriented as planned. In this regard, a stop element configured as a guiding beam may be moved along the x-axis of the feed unit 32, preferably in a controlled manner.

In addition, in FIG. 9, an optional thickness measurement 42 and/or pressing means 43 is shown, which comprises a measuring finger 44 in a preferred embodiment.

To ensure that the vacuum gripper 1 has picked up a component 3 of a thickness required for further processing, the thickness may either be checked by means of the thickness measurement means 42 measuring the front face of the component 3, or by means of the aforementioned measuring finger 44.

When a preferably bent measuring finger 44 is used, the thickness of the component 3 is determined via the angular position of the measuring finger 44 relative to its pivot bearing based on the ratio between the component thickness and the angular position of the measuring finger 44, which ratio is stored in the controller, which is not described in detail. By measuring the component thickness, it may also be ensured that only one single component 3 has been picked up by the vacuum gripper 1.

In this regard, the measuring finger 44 may simultaneously be used as pressing means 43 by applying additional pressing or retention force to the component 3 by means of the bent measuring finger 44. In this process, this pressing or retention force may be selected such that the measuring finger 44 is merely applied, and excessive tilting of the component 3 relative to the suction elements 4, 4' is thus prevented.

Figure 10:
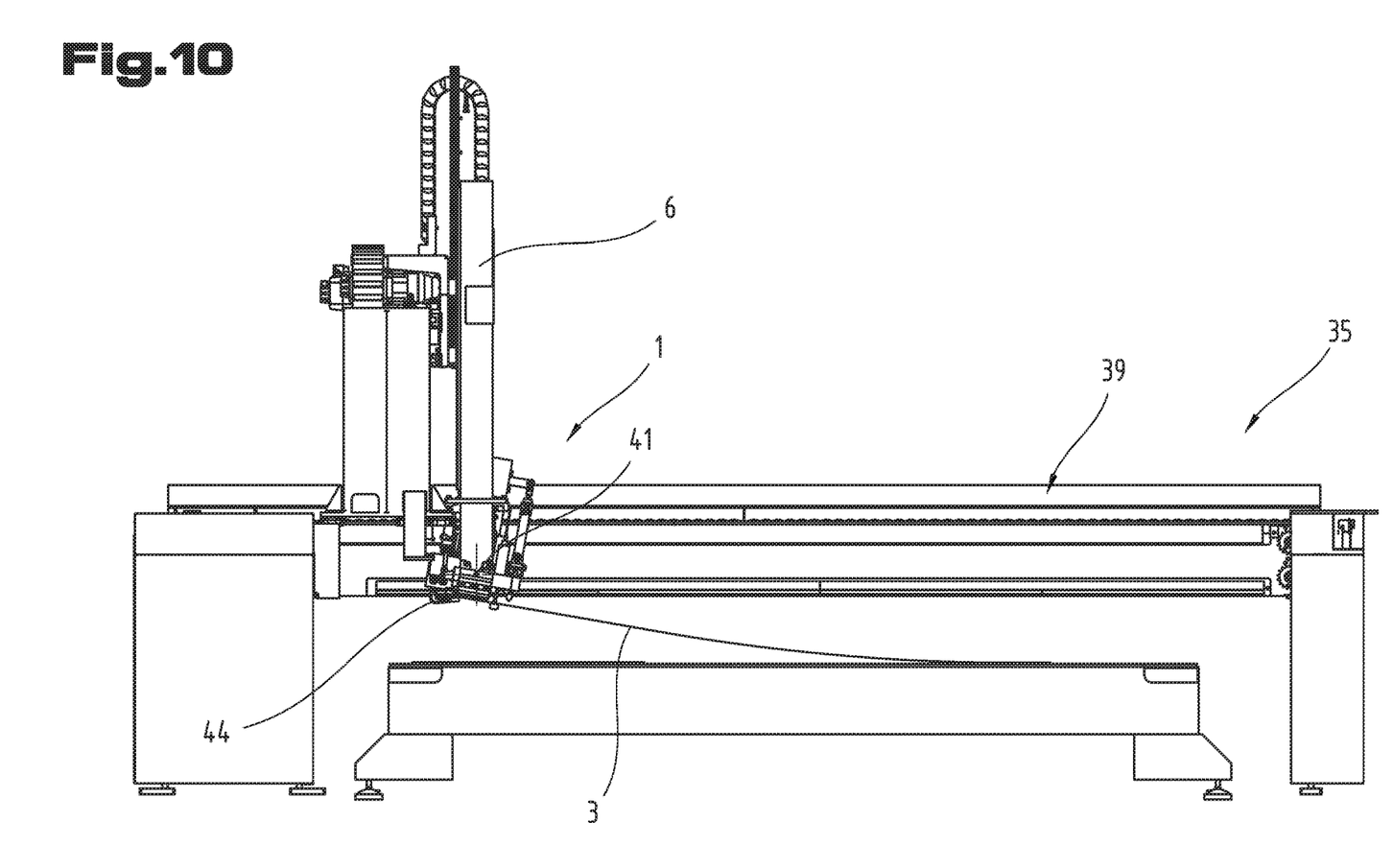
FIG. 10 a flat component in a partially or one-sidedly lifted position for transfer to a conveyor section.

In FIG. 10, a component 3 one-sidedly lifted by the vacuum gripper 1 is shown, which component 3 is in a partially lifted position due to tilting of the vacuum gripper 1 at the support arm 6 about the hinge axis 41. In this regard, the component 3 may be additionally secured by the measuring finger 44. It can be clearly seen from FIG. 10 that the vacuum gripper 1 engages with a lateral end or partial area of the component 3 to lift it up.

Figure 11:
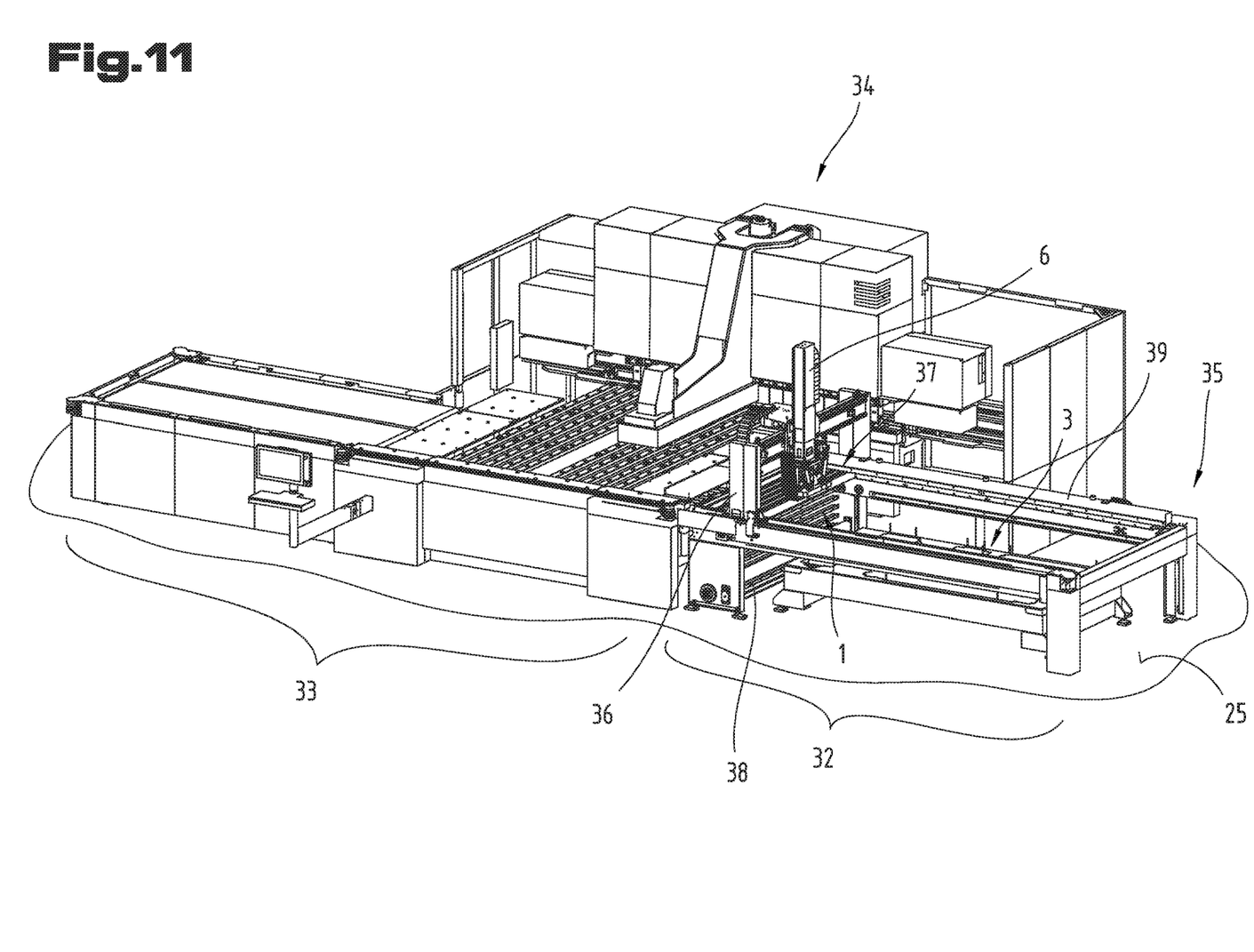
FIG. 11 a possible embodiment of a feed unit in combination with a machining center.

Finally, an overall system comprising a feed unit 32 and a bending unit 33 is shown in FIG. 11. The feed unit 32 is in turn formed by a support structure 35, in which conveyor elements 38 of a conveyor section 37 may be moved relative to the lateral parts 39. Underneath the conveyor section 37, the components 3 are stored at a pick-up location 25 and may be transferred to the conveyor section 37 by the vacuum gripper 1, which is arranged at a portal-like guiding structure 36 via a support arm 6, and be conveyed further to the bending unit 33.

In the area of the bending unit 33, a component 3 is once again transferred from the conveyor section 37 to the bending unit 33, where the component 3 is processed in a bending machine 34.

The illustrations of FIG. 1 to FIG. 11 show possible embodiments; however, it should be noted at this point that the invention is not limited to the embodiments specifically shown; rather, one or multiple combinations of the individual embodiments are possible. For the sake of brevity, no separate illustration is made, and reference is made to the general description.

The scope of protection is determined by the claims. However, the description and the drawings are to be used for construing the claims. The individual features or feature combinations of the different embodiments shown and described may constitute independent inventive solutions. The object underlying the independent inventive solutions may be gathered from the description.

All indications of ranges of values in the present description are to be understood such that they also include any and all sub-ranges therefrom; for example, the indication 1 to 10 is to be understood such that all sub-ranges are included, starting at the lower limit 1 up to the upper limit 10, i.e. all sub-ranges start with a lower limit of 1 or larger and end at an upper limit of 10 or less, e.g. 1 to 1.7, or 3.2 to 8.1, or 5.5 to 10.

As a matter of form, it should finally be noted that for better understanding of the structure, some of the elements have been represented unscaled and/or enlarged and/or in reduced size.

List of reference numbers
1 Vacuum gripper
2 Machine tool
3 Component
4' First suction elements
4 Second suction elements
5 Support part
6 Support arm
7' Individual support part element
7 Support part element
8 First vacuum generator
9 First vacuum circuit
10 Second vacuum generator
11 Second vacuum circuit
12 First group
13 Second group
14 System controller
15 Compressed air supply
16 First sensor device
17 Second sensor device
18 Vacuum tank
19' First suction plane
19 Second suction plane
20 Optical and/or warning device
21 Environment monitoring means
22 Area of movement/machining area
23 Surface
24 Cutout
25 Pick-up location
26 Deposition location
27 Holding element
28 Bearing assembly
29 Actuating assembly
30 Standby position
31 Working position
32 Feed unit
33 Bending unit
34 Bending machine
35 Support structure
36 Portal-like guiding structure
37 Conveyor section
38 Conveyor element
39 Lateral part
40 Storage unit
41 Hinge axis
42 Thickness measurement means
43 Pressing means
44 Measuring finger
45 Component stack

The invention claimed is:

1. A feed unit (32) for a bending machine (34) of a bending unit (33), comprising
a support structure (35);
a vacuum gripper (1) for flat components (3), comprising a support part (5), at least one support part element (7), a plurality of first suction elements (4') arranged at the at least one support part element (7) and defining a first suction plane (19'), and a plurality of second suction elements (4),
a guiding structure (36) for the vacuum gripper (1), which guiding structure (36) is associated with the support structure (35);
a conveyor section (37) running in lateral parts (39) of the support structure (35);
wherein
the vacuum gripper (1) additionally comprises at least one bearing assembly (28) and at least one actuating assembly (29), wherein the at least one support part element (7) is pivotably mounted at the support part (5) by means of the at least one actuating assembly (29) about the at least one bearing assembly (28), and
the vacuum gripper (1) is arranged at the support part (5), wherein the plurality of second suction elements (4) define a second suction plane (19), and wherein the at least one support part element (7) with its first suction plane (19') defined by the plurality of first suction elements (4') can be pivoted about the at least one bearing assembly (28) from a standby position (30) that is at an angle relative to the second suction plane (19) into a working position (31) that is congruous with the second suction plane (19), and vice versa;
conveyor elements (38) forming the conveyor section (37) are retractable and extendable relative to a storage unit (40) of the feed unit (32);
wherein on a side or front face of the support part (5) and/or support part element (7) opposite of the second and/or first suction elements (4', 4), a means for measuring the thickness (42) of a flat component is provided.

2. The feed unit (32) according to claim 1, wherein the guiding structure (36) for the vacuum gripper (1) has a movable support arm (6) at which the vacuum gripper (1) is arranged.

3. The feed unit (32) according to claim 2, wherein the vacuum gripper (1) is hingedly mounted at the movable support arm (6) about a horizontal hinge axis (41).

4. The feed unit (32) according to claim 1, wherein on a side of the support part (5) and/or support part element (7) opposite of the second and/or first suction elements (4', 4), a pressing means (43) for a flat component (3) is provided.

5. The feed unit (32) according to claim 1, wherein on a side of the support part (5) and/or support part element (7) opposite of the second and/or first suction elements (4', 4), a combined pressing and thickness measurement means (42, 43) for a flat component is provided.

6. The feed unit (32) according claim 1, wherein the thickness measurement means (42) comprises a bent measuring finger (44) provided for being applied to a flat component (3) to be measured.

7. The feed unit (32) according claim 6, wherein the pressing means (43) is configured for controlled activation and deactivation of a pressing force towards the measuring finger (44) and for increasing and reducing a retention force of the vacuum gripper (1) towards a flat component.

8. The feed unit (32) according to claim 1, wherein the conveyor elements (38) of the conveyor section (37) are adapted for moving under a flat component (3) from a position at least partially or one-sidedly lifted by means of the vacuum gripper (1) and receive it in a load-absorbing manner.

9. The feed unit (32) according to claim 1, wherein the first suction elements (4') of the support part element (7) have the same dimensions relative to one another with regard to height and/or diameter.

10. The feed unit (32) according to claim 1, wherein the second suction elements (4) of the support part (5) have different dimensions relative to one another with regard to height and/or diameter.

11. The feed unit (32) according to claim 1, wherein the first suction elements (4') are connected to a first vacuum circuit (9) and that the second suction elements (4) are connected to a second vacuum circuit (11).

12. The feed unit (32) according to claim 1, wherein the actuating assembly (29) comprises a mechanical and/or pneumatic actuator.

13. The feed unit (32) according to claim 1, wherein the support part element (7) comprises multiple individual support part elements (7'), which are hingedly connected to each other.

14. The feed unit (32) according to claim 1, wherein on opposite sides of the support part (5), one support part element (7) is respectively provided.

15. A method for conveying flat components (3) to a bending machine (34) of a bending unit (33), comprising the following steps:
providing the feed unit (32) according to claim 1;
shifting the at least one support part element (7), starting from the first suction plane (19') defined by the plurality of first suction elements (4'), from the standby position (30) that is at an angle relative to the second suction plane (19), into the working position that is congruous with the second suction plane (19);
picking (31) a component (3) up by means of the vacuum gripper (1);
moving the conveyor elements (38) of the conveyor section (37) from the storage unit (40) of the feed unit;
receiving the component (3) by means of the conveyor elements (38) of the conveyor section;
releasing the vacuum gripper (1) from the component (3);
conveying the component (3) on the conveyor section (37) to the bending unit (33);
transferring the component to the bending unit (33).

16. The method for conveying flat components (3) according to claim 15, after the component (3) has been picked up from a component stack (45), the component thickness is measured.

17. The method for conveying flat components (3) according to claim 15, wherein after the component (3) has been picked up from a component stack (45), a pressing means (43) engages with the bottom side of the component (3).

18. The method for conveying flat components (3) according to claim 15, wherein the conveyor elements (38) of the conveyor section (37) move under a flat component (3) from an at least partially or one-sidedly lifted position shifted by means of the vacuum gripper (1) and receive it in a load-absorbing manner.

19. The method for conveying flat components (3) according to claim 15, comprising the following steps:
clearing a pick-up location (25) for component stacks (45) underneath the conveyor section (37) by moving all or individual ones of the conveyor elements (38) of the conveyor section (37) into the storage unit (40) of the feed unit, which is arranged at a front face of a support structure (35);
moving the vacuum gripper (1) to a component stack (45) by means of the guiding structure (36), which component stack (45) comprises components (3) of dimensions required for further processing;
adjusting the vacuum gripper (1) into a working width required for gripping the components (3) and into a working position (31) by pivoting support part elements (7) about the bearing assembly (28) by means of the actuating assembly (29), wherein the vacuum gripper (1) only engages partially;
applying a vacuum to the suction elements (4, 4') for picking up the component (3), and lifting the component (3) by moving the vacuum gripper (1) in the y-direction of the feed unit (32), wherein the vacuum gripper (1) is pivoted about the hinge axis (41) at the support arm (6);
successively moving the conveyor elements (38) of the conveyor section (37) under the component (3), which is in an angled position above the support structure (35), by extending the conveyor elements (38) from the storage unit (40) of the feed unit;
cutting off the vacuum at the vacuum gripper (1) when the conveyor elements (38) of the conveyor section (37) have completely moved under the component (3), and transferring the component (3) to the conveyor section (37) for further conveying of the component (3).

\* \* \* \* \*

UNITED STATES PATENT AND TRADEMARK OFFICE
CERTIFICATE OF CORRECTION

PATENT NO. : 11,919,152 B2
APPLICATION NO. : 17/274965
DATED : March 5, 2024
INVENTOR(S) : Matteo Dal Lago et al.

Page 1 of 1

It is certified that error appears in the above-identified patent and that said Letters Patent is hereby corrected as shown below:

On the Title Page

Column 1, Item (73), please change: "TRUMPF Maschinen Austria Gmbh & Co. KG." to correctly read: -- TRUMPF Maschinen Austria GmbH & Co. KG." --

Signed and Sealed this
Eighth Day of October, 2024

Katherine Kelly Vidal
*Director of the United States Patent and Trademark Office*